United States Patent Office 3,071,156
Patented Jan. 1, 1963

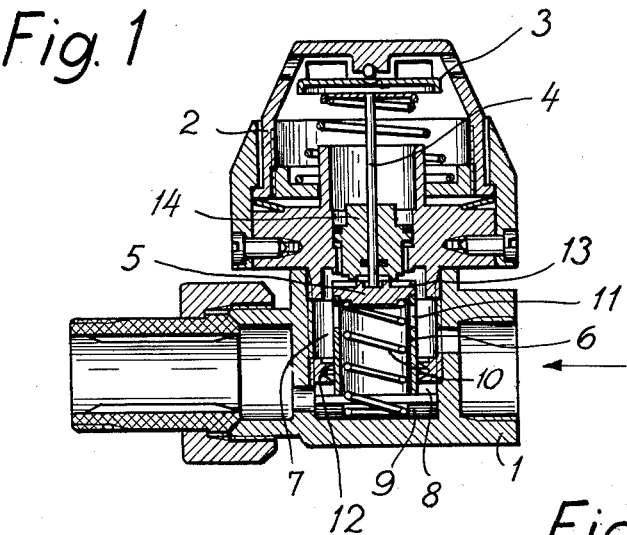
Fig. 1
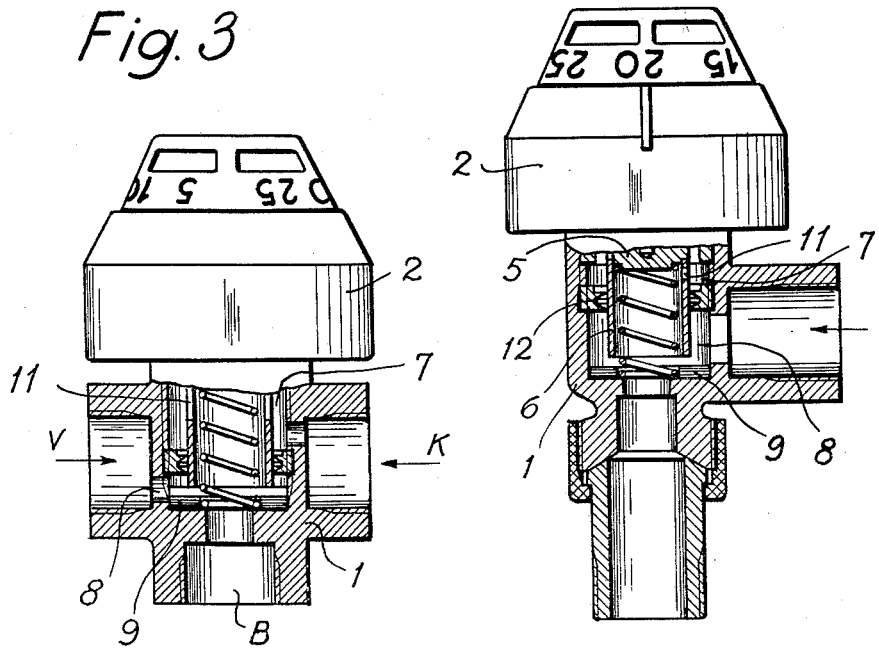
Fig. 2
Fig. 3

3,071,156
REGULATING VALVE WITH CYLINDRICAL
VALVE BODY
Kjeld Porland and Carl Sørensen, Elsmark, Nordborg,
Als, Denmark, assignors to Danfoss ved ingenior Mads
Clausen, Eismark, Nordborg, Denmark, a Danish firm
Filed Dec. 2, 1958, Ser. No. 777,646
Claims priority, application Denmark Dec. 3, 1957
3 Claims. (Cl. 137—625.4)

This invention relates to a regulating valve with a hollow cylindrical valve body which at one end is connected with a valve stem for axial displacement of the valve body for regulating the flow area of an opening limited by a circular valve seat provided in the valve casing and a circular end edge at the other end of the valve body, the cylinder surface of the said valve body being along its circumference in tight sliding contact with a partition between two chambers in the valve casing in which the valve body is mounted.

The object of the invention is to devise a regulating valve, more particularly a thermostatically operated radiator valve with a valve body relieved in such manner that the forces moving the valve body through the valve stem will be of minimum value so that, for example, thermostat regulation with steam pressure instead of the less sensitive liquid pressure regulation may be used with sufficient reliability in operation and so that the diameter of the valve stem may be as small as possible, whereby the transmission of heat from the valve body to the sensitive phial is reduced to a minimum. Another object of the invention is to provide a valve of the said kind that affords a maximum of security against leakages and permits replacement of the packing of the valve stem while the installation is water-filled.

In pilot valve controlled mixing valves it is, for example, known to use relieved, hollow, cylindrical valve bodies which are open at either end and when the said bodies are displaced axially, their edges may cooperate with valve seats which are endwise positioned in relation to the cylinder for regulation of the proportion between the amounts of hot and cold water which are supplied to a mixing chamber, but such known valve bodies are not intended for use in regulating valves such as radiator valves, the valve body of which is mechanically operated by means of a valve stem passing through a stuffing box in the valve casing and where a variable resistance is only desired at one point of the valve. Consequently, ordinary valve discs which are unrelieved have hitherto been used in such valves, and the force necessary for moving the valve is therefore dependent on the pressure difference between the inlet side and the discharge side of the valve.

This drawback is relieved by a regulating valve in accordance with the invention, the essential feature of which is that the valve stem is attached to a closed end bottom of the cylindrical valve body, the cylindrical wall of the said body being provided with openings connecting the interior of the valve body with the chamber of the valve casing that faces the stem, in addition to which there is provided a stop cooperating with the end bottom to limit the movement of the piston in the direction towards the stem, the said stop being so designed that a substantial part of the outer side of the end bottom is always free. Such a valve with a readily movable valve body is very suitable for use where as is, for example, the case in thermostatically operated, steam regulated radiator valves, there is only a relatively slight pressure available, and the valve is furthermore advantageous in that it can readily be made so that it is possible to replace the stuffing box of the valve stem while there is water in the installation. This is, for example, possible in a preferred embodiment of a valve according to the invention, an essential feature of which is that the closed end bottom of the valve body has an annular sealing surface on its outer side which sealing surface together with a valve seat formed in the valve casing constitutes a non-return valve for closing an inside threaded hole for an exchangeable stuffing box.

The exchangeable stuffing box may have a part projecting into the valve casing and constituting a stop for the valve body the said part being adjustable in axial direction. The axial adjustment may, as a rule, be performed by simply screwing the stuffing box more or less into the screwthread in the valve casing, and as a result easy preadjustment of the flow resistance desired in the valve is obtained at fully open valve.

In accordance with the invention the valve spindle is made of a material having low thermal conductivity, preferably stainless steel, and is of small diameter. As a result, the heat transmitted in a radiator valve from the solid end bottom of the valve body through the stem to the sensitive phial is a minimum, and furthermore the risk of water leaking out along the stem is reduced.

A regulating valve according to the invention may be adapted as a flow valve and cut-off valve, or it may be adapted as a mixing valve which regulates the feed of one of the mixing components.

The invention will now be described in detail with reference to the drawing, in which FIGURE 1 shows an embodiment of a regulating valve in accordance with the invention, designed as a straightway valve, FIGURE 2 a valve designed as an angle valve, and FIGURE 3 a valve designed as a mixing valve.

The valves disclosed are thermostatically operated radiator valves with a casing 1 connected with a regulating casing 2 and an adjustable, thermal sensitive control member 3 for moving the valve stem 4 in axial direction. The end of the valve stem 4 that projects into the valve casing is connected with a closed end bottom 5 on a cylindrical valve body 6 which passes through two chambers 7 and 8 into which the valve casing is divided and which by means of a packing ring 12 is in tight, sliding connection with a hole provided in a partition between the said chambers. The end of the valve body remote from the spindle is open and the end edge of the cylinder forms together with a rubber-covered valve seat 9 a regulable flow opening which may be cut off by the valve body being pressed down by means of the spindle 4, overcoming the action of a spring 10. Through openings 11 the chamber 7 in the valve casing communicates with the interior of the cylinder and extends above the closed end bottom 5 so that the valve body is relieved and may be moved by the valve spindle 4 without using any large forces.

In the valve shown in FIGURE 1 the water flow enters in the direction indicated by the arrow, passing from the chamber 7 through the hollow cylindrical body to the lower end edge, where the flow is throttled in accordance with the position of the valve body in axial direction which is determined by the thermal sensitive control member 3.

On top of the closed end bottom there is an annular rubber-covered sealing surface 13 which may rest in contact with the sealing edge or a valve seat at the upper end of the chamber of the valve casing when a stuffing box 14 mounted in a threaded hole in the valve casing is screwed upwards for replacement of the packing, which can be done also when there is water in the installation, since the closed end bottom 5 will thereby act as a non-return valve. Normally, the lower end of the stuffing box 14 projects a certain distance into the valve chamber and limits the upward movement of the valve body. By screwing the stuffing box 14 more or less into the valve chamber, the flow resistance at fully open radiator valve may be pre-adjusted at the desired value.

Since but small forces are required for moving the valve body, the valve stem may be of very small diameter, for example, 2 mm., whereby there is a minimum risk of water leaking along the stem, just as the amount of heat which may be transmitted from the solid end bottom 5 to the thermal sensitive control member 3 is negligible, in particular if the stem is made of a material such as stainless steel which is of low thermal conductivity.

The radiator valve disclosed in FIGURE 2 is an angle valve in which the water flows into the chamber 8 from the right as indicated by an arrow and is throttled between the end edge of the valve body and the valve seat 9. Through the openings 11 in the valve cylinder the chamber 7 is in constant communication with the downward facing discharge pipe of the valve body.

The regulating valve disclosed in FIGURE 3 is designed as a mixing valve, in which cold water as indicated by the arrow K is passed into the chamber 7 through the openings 11 provided in the valve body to a discharge pipe B, whereas hot water as indicated by an arrow V is fed to the chamber 8 from the left, from where it is admixed with the cold water by an amount determined by the distance of the valve body above the valve seat 9 and is discharged through the pipe B.

It will be understood that a regulating valve in accordance with the invention besides being used as a radiator valve in a central heating installation may have a wide field of application and be used for other media and be automatically operated as well as operated by hand. It has been found in practice that in a valve designed as disclosed in the foregoing there is no tendency to calcareous deposits which may prevent tight closing of the valve.

What we claim and desire to secure by Letters Patent is:

1. A regulating valve adapted for thermostatic operation comprising, in combination, a casing, a hollow cylindrical valve body disposed in said casing and having a cylindrical wall with a closed end and an open end, said casing being formed with an opening defined by a circular valve seat and said valve body being formed with a circular edge at said open end for cooperation with said seat, a valve stem connected at one end to said closed end for axial displacement of the valve body for regulating the flow area of said opening, a partition dividing said casing into two chambers and the cylinder surface of the said valve body being in tight contact with said partition and the cylindrical wall of the said body being provided with openings connecting the interior of the valve body with the chamber of the valve casing facing the stem, and a stop cooperating with the closed end of said body to limit the movement of the body in the direction towards the stem, said stop being engageable with said closed end to leave a part of the outer side of the closed end always free, and spring means normally urging said valve body toward said stop, a closure member engaged with said casing and having a threaded opening threadedly receiving said stop, said stop being apertured to receive said valve stem and said closed end bottom of the valve body having an annular sealing surface on its outer side for engagement with the surface of said closure adjacent said opening for closing said opening when the stop is removed.

2. A regulating valve adapted for thermostatic operation comprising, in combination, a casing, a hollow cylindrical valve body disposed in said casing and having a cylindrical wall with a closed end and an open end, said casing being formed with an opening defined by a circular valve seat and said valve body being formed with a circular edge at said open end for cooperation with said seat, a valve stem connected at one end to said closed end for axial displacement of the valve body for regulating the flow area of said opening, a partition dividing said casing into two chambers and the cylindrical surface of the said valve body being in tight contact with said partition and the cylindrical wall of the said body being provided with openings connecting the interior of the valve body with the chamber of the valve casing facing the stem, and an axially-adjustable stop cooperating with the closed end of said body to limit the movement of the body in the direction towards the stem, said stop being engageable with said closed end to leave a part of the outer side of the closed end always free and said stop having projection means engaging said closed end of said valve body symmetrically along surfaces spaced radially outwardly from said stem and spaced radially inwardly from the outer periphery of said closed end of said valve body, whereby to insure balancing of said valve body, and spring means normally urging said valve body toward said stop, said stop being constructed as an exchangeable stuffing box axially movable within said valve casing and having a part projecting into said valve casing to define said stop for the valve body, said projecting part of said stuffing box having a face for engagement with the axially outer side of said closed end of said cylindrical valve body.

3. A regulating valve for thermostatic operation comprising, in combination, a casing having a wall defining a valve recess, a hollow cylindrical valve body disposed in said recess and having a cylindrical wall with a closed end and an open end, said casing being formed with an opening in said recess defined by a circular valve seat and said valve body being formed with a circular edge at said open end for cooperation with said valve seat, a valve stem connected at one end to said closed end for axial displacement of the valve body for regulating the flow area of said opening, a partition dividing said recess into two chambers and the cylindrical surface of said valve body being in tight contact only with said partition but being free from contact with the casing wall defining said recess and the cylindrical wall of said valve body being provided with openings connecting the interior of the valve body with the chamber of the valve casing facing the stem, and an adjustable stop cooperating with the closed end of said body to limit the movement of the body in the direction towards the stem, said stop being engageable with said closed end to leave a part of the outer side of the closed end always free and said stop having projection means engaging said closed end of said valve body symmetrically along surfaces spaced radially outwardly from said stem and spaced radially inwardly from the outer periphery of said closed end of said valve body, whereby to insure balancing of said valve body, and spring means normally urging said valve body toward said stop.

References Cited in the file of this patent

UNITED STATES PATENTS

| | | |
|---|---|---|
| 802,490 | Bashlin | Oct. 24, 1905 |
| 817,153 | Barr | Apr. 10, 1906 |
| 1,119,287 | Krichbaum | Dec. 1, 1914 |
| 1,143,999 | Rosencrans | June 22, 1915 |
| 1,998,239 | Irwin | Apr. 16, 1935 |
| 2,010,088 | Kohler | Aug. 6, 1935 |
| 2,564,286 | Stephany | Aug. 14, 1951 |
| 2,672,157 | Branson | Mar. 16, 1954 |
| 2,749,047 | Dotson | June 5, 1956 |
| 2,780,233 | Volpin | Feb. 5, 1957 |
| 2,851,241 | Wallgren | Sept. 9, 1958 |
| 2,880,752 | Kreuttner | Apr. 7, 1959 |